Jan. 2, 1962    G. KESSLER    3,015,427
ENDLESS CONVEYER MEANS FOR DEFORMABLE ARTICLES
Filed Feb. 10, 1960

INVENTOR
Gerald Kessler

BY Max L. Libman

ATTORNEY

United States Patent Office 3,015,427
Patented Jan. 2, 1962

3,015,427
ENDLESS CONVEYER MEANS FOR
DEFORMABLE ARTICLES
Gerald Kessler, 7249 Glenwood Ave., Youngstown, Ohio
Filed Feb. 10, 1960, Ser. No. 7,885
5 Claims. (Cl. 226—172)

This invention relates to conveyer means of the endless belt type, particularly adapted for the handling or conveying of limp, easily deformable articles.

In the production of plastic extrusions, a continuous length of plastic material of a desired cross-sectional configuration is extruded from a die in a hot, limp, and readily deformable condition. Usually, the length of extruded material is quickly passed into an elongated cooling bath in order to lower its temperature and give the material a permanent set as quickly as possible. As soon as the material has set sufficiently so that it can be handled without deforming it, it is usually cut up into standard lengths suitable for packaging, or else wound on forms into coils of suitable lengths. Due to the soft, limp condition of the freshly extruded material, it must be handled very carefully until it has set, in order to prevent it from becoming deformed to the point where it would be worthless.

It is a primary object of the invention to provide a means for handling material such as freshly extruded plastic, as well as any other similarly limp and soft material which cannot be readily handled by conventional conveyer means without danger of injuring same.

Another object is to provide a simple conveyer means which can be readily adapted to existing standard types of conveyers for handling soft, limp material without damaging same.

The above objects are achieved essentially by providing conveyer belts having contiguous portions for supporting substantially all sides of a length of conveyed material between them, said contiguous portions being softer and even more readily deformable at their contiguous surface portions, or at least one of said portions, than the material being conveyed between them. In this manner, the material is firmly supported all along its length without distortion, and can even be conveyed along relatively tortuous paths to arrive at a desired destination in good condition.

The specific nature of my invention as well as other objects and advantages thereof will clearly appear from a description of a preferred embodiment as shown in the accompanying drawing, in which.

Figure 1:
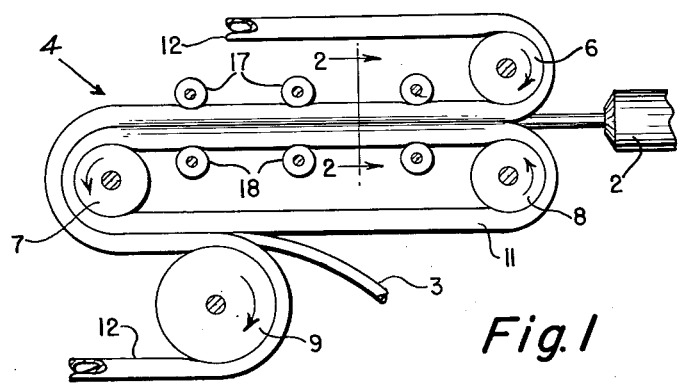
FIG. 1 is a schematic diagram of a conveyer system for handling a plastic extrusion in accordance with the invention.

Referring to FIG. 1, a conventional extrusion die is shown at 2, from the orifice of which issues a continuous length of extruded plastic material 3 as shown, by way of example only, as being a plastic hose, which it is desired to maintain circular in cross section until the plastic material has set. At the moment the extrusion 3 issues from the die, it is hot and limp, and can be very easily deformed even by slight pressure. However, the types of material ordinarily employed for commercial extrusions harden or "set" very rapidly as they are cooled down. For this reason, they are usually conveyed along for a sufficient distance to enable them to become cool. At least a substantial portion of this distance is usually in a cooling bath of water or similar fluid. Although such a bath is not shown in FIG. 1, it will be understood that there maye be a length of cooling bath interposed between the extrusion die 2 and the conveyer means generally indicated at 4. In some instances, the entire conveyer system shown, or part of it, may be operated within a cooling bath, and all of the operative parts of the conveyer system in that case may be made of suitable materials for continuous operation in a fluid medium.

The conveyer system 4 comprises a series of pulleys 6, 7, 8, 9, etc., as required for any particular conveyer system. In the example shown in FIG. 1, essentially two endless belts of unequal length are employed. Belt 11 runs over pulleys 7 and 8, and for a considerable portion of its course the outer surface of the belt is contiguous to the corresponding outer surface of another endless belt 12, only a portion of which is shown. Belt 12 runs over pulleys 6 and 9, and between them it also runs over pulley 7, exteriorly to belt 11, as clearly shown in FIG. 1. Only a portion of belt 12 is shown, but it will be apparent that the ends of the belt are connected to each other over another suitable system of pulleys, which is not shown, as it is not necessary to a disclosure of the present invention.

Figure 2:
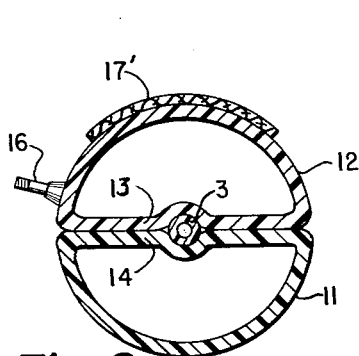
FIG. 2 is a sectional view, on an enlarged scale, taken on line 2—2 of FIG. 1.

Except for their lengths, belts 11 and 12 may be identical in construction, as indicated in FIG. 2. Each belt is in the form of a hollow tube, somewhat similar to an inner tube, except that it can be much thinner, since it is not required to be inflated to any substantial pressure. Each tube contains a quantity of fluid, which may be either gas or liquid, so as to maintain sufficient pressure between the contiguous surfaces 13 and 14 to handle the limp extruded plastic material, yet to be even more readily deformable at any given point or points on the adjacent surfaces than is the extruded plastic material itself. In this manner, although the plastic extrusion is firmly gripped, it is gripped with such a light pressure that it is not deformed to any appreciable extent.

It will be understood that the degree of pressure which the plastic extrusion can withstand is dependent upon a number of factors, such as the type of material employed, the wall thickness of the extrusion, etc. However, by using tubular belting 11 and 12 having suitably thin walls, and by adjusting the amount of fluid contained within each belt member, it is readily possible to adjust the belt pressure for each type of extrusion so as to satisfactorily handle the material. As shown in FIG. 2, where gas or air is employed as the pressure medium within the belt, a conventional tire valve such as 16 can be employed to adjust the gas pressure. Where liquid is employed, a liquid connection and suitable tap means may be provided instead of the tire valve 16.

It will be noted that a configuration is provided in FIG. 1 whereby the extruded plastic 3 is conveyed around pulley 7 and reversed in direction. This is done to show the versatility of the system, although ordinarily it will be employed for straight runs.

Where a run of the conveyer is to be of considerable length, it will usually be desirable to provide a number of supporting pulleys or rollers as shown at 17 and 18 to add sufficient stiffness and rigidity to the length, and to maintain adequate pressure between the adjacent surfaces of the conveyer at all points along the active length thereof.

Figure 3:
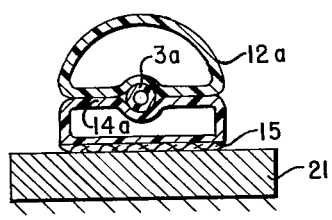
FIG. 3 is a similar sectional view of an alternative form of construction.

As shown in FIG. 2, the tubular belts 11 and 12, or at least one of them, may be formed with a depression or axial groove along its center line at the active surface thereof. This is particularly suitable where narrow extrusions or similar articles are to be handled and in effect, provides a pre-formed belt surface generally accommodating itself to the cross-sectional shape of the extrusion. This serves to both keep the extrusion centered on the belt and also tends to provide a uniform gripping pressure all around the periphery of the elongated article being conveyed. As shown in FIG. 3, at least the bottom of the lower belt 14a may be made flat, preferably by cementing or otherwise fastening it to a relatively heavy ordinary flat belt 15, or even by merely making the lower side of 14a of sufficient thickness so that its own inherent rigidity will give it the desired flat shape. The advantage of this shape is that instead of rollers 18, as shown in FIG. 1, a smooth table 21, preferably of metal, can be used to support the belt so that it is kept perfectly straight at all points with no tendency to bend or wiggle the transported extrusion. The top belt may be similarly made, if desired, and a smooth guiding surface like 21 may also be provided if the weight of the upper belt is not sufficient to firmly grip the transported object between the two belts.

Figure 4:
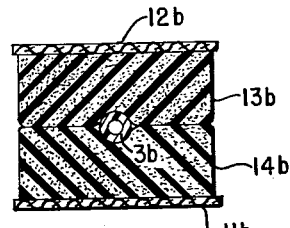
FIG. 4 is a similar sectional view of a further alternative form of construction.

FIG. 4 shows a cross section of belting similar to that shown in FIGS. 1 and 2, except that instead of using a fluid as the pressure medium, the belt surface is formed of a deep "pile" or thickness of very soft material such as sponge rubber or plastic. Alternatively, a literal "pile" of individual soft fingers or fibers like those on a very deep rug or a soft brush may be used, which has the advantage of not requiring a fluid-tight tubular belt, but on the other hand is not adjustable to different degrees of pressure. This type of belting is preferably made with a tough, unyielding backing as shown at 11b and 12b, which is capable of taking the required strain and maintaining firm pressure on the conveyed article. It will be apparent that the non-contacting portions of the belt shown in FIG. 2 can also be reinforced with suitable webbing or other belting material as shown at 17'.

It will be understood that the surface speeds of the two contiguous belts are made the same so that no shear or distortion force is applied to the conveyed object.

It will be apparent that the embodiments shown are only exemplary and that various modifications can be made in construction and arrangement within the scope of my invention as defined in the appended claims.

I claim:

1. Conveyor belt means for handling lengths of easily deformable material without substantially deforming same, comprising two endless belts having conveying portions thereof contiguous to each other for a distance sufficient to support a substantial axial length of material, means for driving said portions in the same direction at the same speed, at least one of the adjacent surfaces of the contiguous portions of said belts being soft and yielding to support a limp and easily deformable article therebetween without substantial deformation, at least one of said belts being an endless length of fluid-tight hose in partially inflated condition, and of sufficient width to laterally enfold an article carried between the said belts.

2. The invention according to claim 1, said one belt having an inelastic, tough reinforcing backing on the side away from the soft portion thereof.

3. The invention according to claim 1, said one belt being an endless gas-filled tube, and gas-valve means on said tube for controlling the gas-pressure in said tube.

4. The invention according to claim 3, the surface of said tube adjacent to the other tube being generally flat.

5. The invention according to claim 4, said generally flat surface having a longitudinally extending depressed portion for reception of a length of material to be handled.

References Cited in the file of this patent

UNITED STATES PATENTS

| | | |
|---|---|---|
| 2,130,586 | Huston | Sept. 20, 1938 |
| 2,272,323 | Lawrence | Feb. 10, 1942 |
| 2,297,295 | Flintjer | Sept. 29, 1942 |
| 2,696,907 | Fisk | Dec. 14, 1954 |
| 2,709,000 | Frank et al. | May 24, 1955 |
| 2,805,765 | Saum et al. | Sept. 10, 1957 |
| 2,867,480 | Cushman | Jan. 6, 1959 |